(12) United States Patent
Rantala et al.

(10) Patent No.: US 9,493,373 B2
(45) Date of Patent: Nov. 15, 2016

(54) APPARATUS FOR CONVEYING A GLASS SHEET ON AN AIR SUPPORT TABLE IN A HEATING FURNACE

(71) Applicant: GLASTON FINLAND OY, Tampere (FI)

(72) Inventors: Mikko Rantala, Tampere (FI); Harri Kylväjä, Pirkkala (FI); Jukka Vehmas, Tampere (FI)

(73) Assignee: GLASTON FINLAND OY, Tampere (FI)

( * ) Notice: Subject to any disclaimer, the term of this patent is extended or adjusted under 35 U.S.C. 154(b) by 24 days.

(21) Appl. No.: 14/501,836

(22) Filed: Sep. 30, 2014

(65) Prior Publication Data

US 2015/0096331 A1    Apr. 9, 2015

(30) Foreign Application Priority Data

Oct. 3, 2013 (FI) ..................... 20135990

(51) Int. Cl.
*C03B 35/24* (2006.01)
*C03B 29/12* (2006.01)

(52) U.S. Cl.
CPC .............. *C03B 35/24* (2013.01); *C03B 29/12* (2013.01); *C03B 2225/00* (2013.01)

(58) Field of Classification Search
CPC ........................................ C03B 35/24–35/246
See application file for complete search history.

(56) References Cited

U.S. PATENT DOCUMENTS

| | | |
|---|---|---|
| 3,374,078 A | 3/1968 | Wright |
| 4,200,446 A | 4/1980 | Koontz |
| 5,078,775 A | 1/1992 | Maltby, Jr. et al. |
| 2005/0002743 A1 | 1/2005 | Moriya et al. |
| 2005/0129469 A1 | 6/2005 | Ikehata et al. |
| 2011/0167871 A1 | 7/2011 | Vehmas et al. |

FOREIGN PATENT DOCUMENTS

| | | |
|---|---|---|
| EP | 2343266 A1 | 7/2011 |
| FI | 934061 A | 9/1993 |
| FI | 95123 C | 12/1995 |

OTHER PUBLICATIONS

Search Report issued Aug. 21, 2014, by the Finnish Patent Office in corresponding Finnish Patent Application No. 20135990, (1 page).
European Search Report dated Mar. 5, 2015 for corresponding Application No. 14397528.2.

*Primary Examiner* — Erin Snelting
(74) *Attorney, Agent, or Firm* — Buchanan Ingersoll & Rooney PC

(57) ABSTRACT

An apparatus for conveying glass sheets on an air support table, which is included in a heating furnace and provided with blast apertures and exhaust apertures, and in which the blast apertures are connected to a plenum chamber present underneath the air support table. The exhaust apertures are connected to exhaust passages present inside the table. The exhaust passages have at least one of their ends provided with a gate/gates capable of being opened and closed, by means of which the flow of air from the exhaust passages' ends adjacent to the gate/gates can be completely or partially blocked.

8 Claims, 3 Drawing Sheets

APPARATUS FOR CONVEYING A GLASS SHEET ON AN AIR SUPPORT TABLE IN A HEATING FURNACE

The invention relates to an apparatus for conveying glass sheets on an air support table included in a heating furnace and having its top surface set at an inclination angle of 0-20 degrees relative to horizontal plane, said apparatus comprising conveying rollers at that edge of the air support table towards which the air support table has its top surface inclined. A horizontal position of the air support table is possible, if conveying rollers are replaced with a conveyor in physical contact with the glass. In the air support furnace, the glass is heated to a tempering temperature. The air support table features blast and exhaust apertures. The air flowing by way of blast apertures to below the glass generates underneath the glass an overpressure with respect to a pressure existing in the furnace, on which is based the floating of glass on a bed of air. The glass supporting overpressure is at its peak at pressure apertures. The exhaust apertures prevent bulging of the glass as the air blasted to below the glass is able to escape not only by the edges of glass but also elsewhere. What is meant by bulging of the glass is its bending to a convex shape as the supporting pressure and air bed below the glass is higher in the middle than along the edges. Bulging is encouraged by the reduction of glass stiffness as thickness decreases and temperature rises.

The glass has a density of about 2500 kg/m$^3$. In order to have the glass floating, the average overpressure under the glass must be about 25 Pa per glass thickness millimeter. Accordingly, for example 10 mm glass requires below itself an overpressure of about 250 Pa in the air bed. Blasting is controlled by varying the overpressure in a plenum chamber below the table where the mouths of blast apertures are located. This so-called blast pressure is adjusted by varying rotational speed of the blower. The effect of exhaust apertures on supporting the glass is dependent on the number of apertures, the diameter of apertures, and the tightness of flow channels on the way from exhaust aperture back to furnace. As the exhaust aperture area increases, the blast apertures require more and more blast pressure for bringing the glass to float in order to provide an air bed below the glass with the aforesaid average overpressure of about 25 Pa per glass thickness millimeter.

Publication U.S. Pat. No. 4,200,446 discloses a gas hearth block similar to the above-described air support table in a heating furnace for glass sheets, wherein exhaust apertures are connected to exhaust passages included in the hearth block. The blower is positioned outside an actual furnace chamber next to the furnace. The blower draws air directly from the furnace. What with respect of the pressure of exhaust passages is an overpressure, generated in the air bed by weight of the glass, displaces air from under the glass by way of exhaust apertures into the exhaust passages by whose ends the air flows from the hearth back into the furnace. The exhaust passages have an overpressure with respect to a pressure existing in the furnace as a result of an overpressure in the air bed. The airflow streaming by way of the exhaust apertures increases as the air bed's overpressure increases along with glass thickness. The effect of exhaust apertures on supporting the glass cannot be adjusted in any way.

Publication U.S. Pat. No. 3,374,078 describes an air support table, wherein the exhaust apertures can be adjusted (constricted) with a flat bar or a tube, which is to be inserted into an exhaust conduit and whose holes determine the size of an exhaust aperture. The tube can be rotatable for bringing various rows of holes in alignment with exhaust apertures. The sizes of holes in flat bars or tubes change in each row of holes with larger holes in the middle and smaller ones along the edges, thus providing an evenly distributed support. The flat bars or tubes result in extra structures inside the exhaust conduits with increasing costs. In addition, the shape of exhaust conduits is restricted by the tubes. Fitting and replacing lengthy flat bars or tubes inside exhaust conduits (or rotating the tubes) in connection with the replacement of glass loads is an awkward process.

As opposed to thin glasses, the bulging of thick glasses does not occur easily on an air bed even with an overpressure in the air bed higher in the middle than along the edge regions. The stiffness is increased not only by thickness but also by a lower tempering temperature, i.e. the final heating temperature, which can be used in the case of thick glass. The material characteristics that increase glass stiffness are e.g. at 630° C. clearly more pronounced than at 670° C. In the case of thick glass, the impact of exhaust apertures on the straightness of glass is not as significant as in thin glass. A maximum support pressure for the air bed is obtained when there are no exhaust apertures. In the apparatus according to the invention, exhaust apertures cannot be excluded when the furnace is hot, but the impact of exhaust apertures can be eliminated. This is equivalent to the total absence of exhaust apertures.

It is an object of the invention to provide an apparatus of the aforesaid type, wherein the deteriorating effect of exhaust apertures on the air support of glass can be eliminated partially or completely. This provides a possibility of floating glass of ever increasing thickness and presents air support with more air support adjustability. The above-recited combination of benefits with respect to prior air support tables in furnaces is achieved with an apparatus as presented in the patent application's independent claim.

In an apparatus according to the invention, the impact of exhaust apertures can be partially eliminated by using a gate for closing one end of the exhaust passages completely or by using gates for closing both ends of the exhaust passages just partially. In both cases, the gates constrict the air escape paths from the exhaust passage and thereby increase the tightness of flow channels on the way from exhaust aperture back to furnace.

In an apparatus according to the invention, the impact of exhaust apertures can be completely eliminated by using gates for closing both ends of the exhaust passages. In this case, the air is not able to go anywhere from under the table by way of the exhaust apertures, nor do the exhaust apertures then have an impact that would undermine the support of glass.

An exemplary embodiment of the invention will now be described with reference to the accompanying drawings.

FIGS. 1 and 2 are marked with reference numerals for the components.

Figure 1:
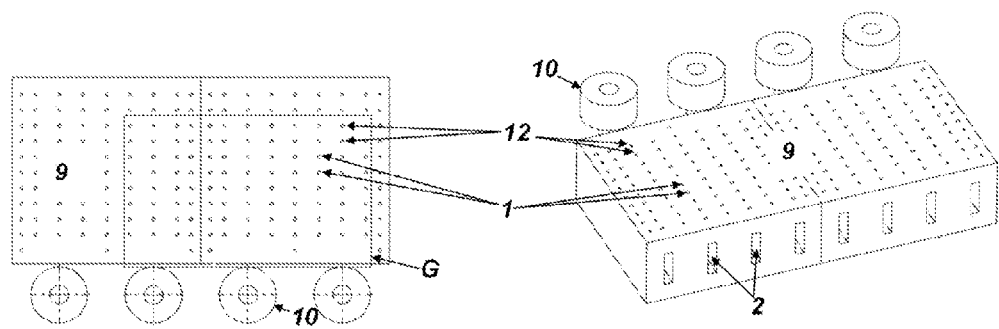
FIG. 1 shows a ceramic air support table 9 with its conveying rollers 10 in a plan view and in a perspective view.
Figure 2:
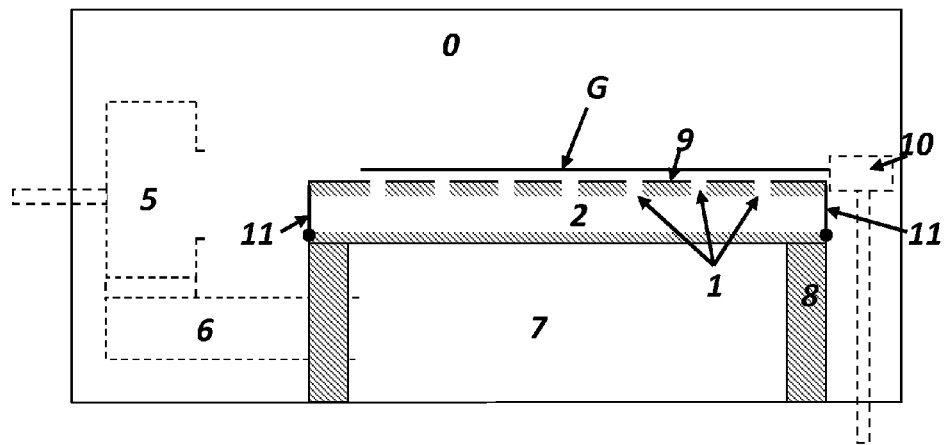
FIG. 2 shows an air support table and blast passages in a cross-sectional view.

Glass G floats on top of a table 9. Between the glass G and the table 9 is a thin bed of air with a thickness of about 1 mm. In FIGS. 2-5, the air support table 9 is in a horizontal position. In reality, the air support table 9, equipped with conveying rollers 10 and its relevant components, is at an angle of 1-20° relative to horizontal, the side with conveying rollers 10 being closer to the floor than the side with a blower 5. The inclination presses a side edge of the glass G against the conveying rollers 10. The motion speed of glass G in the furnace is equal to peripheral speed of the rollers 10. The air support table 9 has exhaust apertures 1, leading to rectangular exhaust passages 2 present inside the table. Both ends of the exhaust passages 2 to a furnace 0 are open whenever gates 11 are open. The blower 5 pressurizes the air and conducts it by way of a pressure conduit 6 into a plenum chamber 7. The plenum chamber walls are made up by the floor of a furnace, the air support table 9, and load-bearing walls 8. In the plenum chamber 7, at the mouths of blast apertures 12, the air pressure is consistent. By way of the blast apertures 12 extending through the entire thickness of the air support table 9, the air discharges into an air bed underneath the glass G or directly into the furnace 0 in case there is no glass on top of the blast aperture. From the air bed, the air escapes by way of the exhaust apertures 1 into the exhaust passages 2 and by way of the air bed edges into the furnace 0. In the air support table, both the blast apertures 12 and the exhaust apertures 1 are organized in rows. A pressure difference between the plenum chamber 7 and the furnace 0 or the furnace exterior is measured with a pressure gauge, such that the blast pressure is known and adjustable by changing rotational speed of the blower 5.

Figure 3:
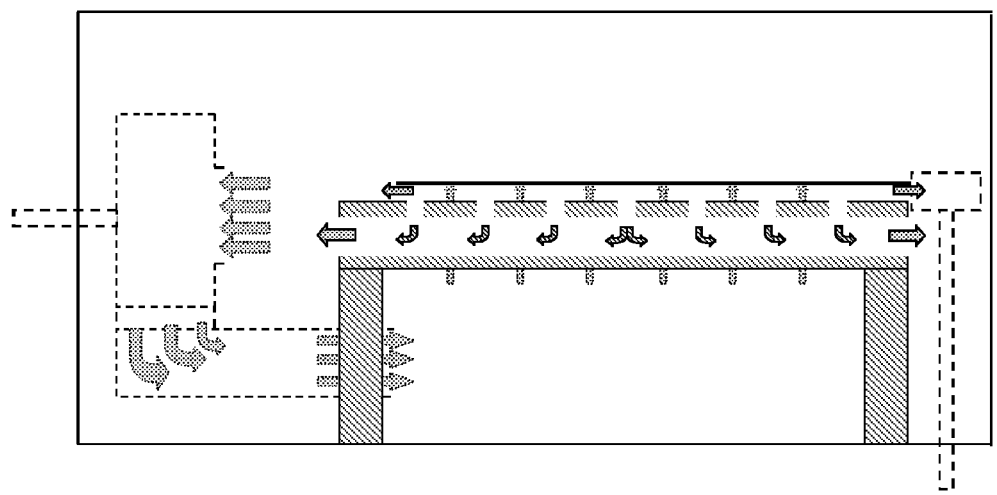
FIGS. 3-5 illustrate airflows in the cross-section of FIG. 2.
Figure 4:
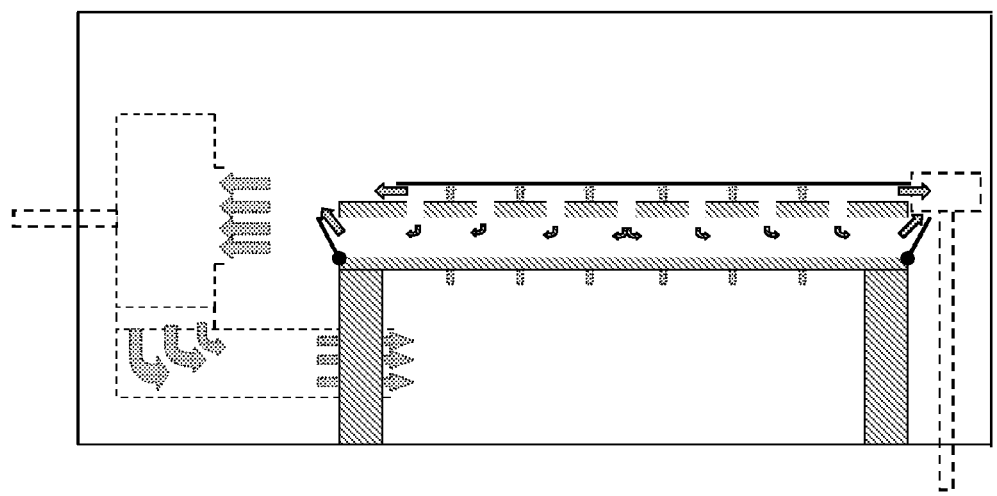
Figure 5:
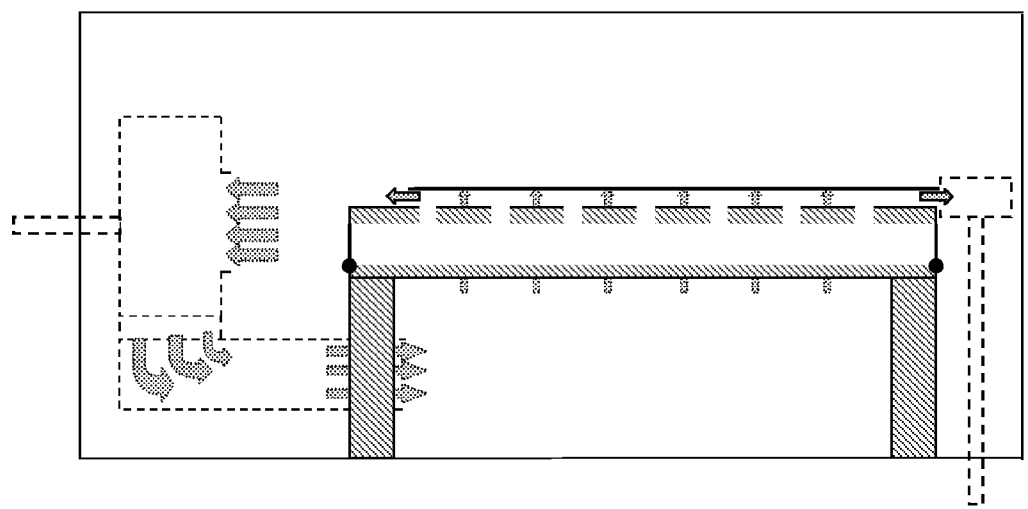

The difference between FIGS. 3 and 5 relates to the positions of gates 11. In FIG. 3, the gates are absent or fully open. In FIG. 4, the gates 11 are partially and to an equal extent open at both ends of the exhaust passages 2. In FIG. 5, the gates 11 are closed and block the flow of air through the ends of the air support table's 9 exhaust passages 2 into the furnace 0. In FIG. 5, there is no flow in the exhaust passages 2 as the air is not able to flow forward therefrom.

In FIG. 4, the undermining impact of exhaust apertures on an average overpressure of the air bed has been mitigated by constricting the escape path of air with the gates 11. In FIG. 5, the exhaust apertures have no impact on an average overpressure of the air bed, i.e. the support for glass on the air bed is at its maximum. Examples regarding the use of gates are the following three cases, wherein the glass to be tempered has different thicknesses. In all cases, the glass is tempered. The second moment of area opposing the bending increases in the third power of glass thickness. For thin 2 mm glass the tempering temperature is 670° C., for 6 mm glass it is 630° C., and for 10 mm glass 620° C. Over the temperature range of approximately 600-700° C., glass changes from elastic to plastic material, whereby at temperatures of more than 600° C. the elastic modulus of glass is unspecific for definition. Roughly, the elastic modulus of glass declines to about a fifth as the glass temperature rises from temperature 620° C. to temperature 670° C. As elasticity decreases along with the changing temperature, glass is subjected to creeping, i.e. bending in relation to time, at an increasingly rapid rate.

At its tempering temperature, thin 2 mm glass is flexible and shapes quickly to match supporting differences in the air bed of an air support table. Thus, it is absolutely necessary to make the supporting strength of an air bed as consistent as possible for enabling the furnace to produce straight glass. It cannot be managed without the exhaust apertures 1. The gates 11 are fully open at both ends of the exhaust passages. In addition, the motion speed of glass must be sufficient in order to prevent the alternately repeated supporting maxima (at blast aperture rows) and minima (at exhaust aperture rows) from imparting to glass a wavy shape. The consistency of support is the more vital the closer is a transfer to quenching, whereby, in the air support furnace at the start of heating, the gates 11 can be almost closed or momentarily closed, such that the support pressure rises slightly and increases the air bed height. For example, the scratching risk of glass is mitigated along with an increase in the air bed height as the glass is no longer as likely to collide locally and momentarily with the table. On the other hand, as the air bed increases in height, the bulging of glass increases. The medium thickness 6 mm glass is considerably more rigid at its tempering temperature than 2 mm glass. In order to float, it requires in the air bed an overpressure 3 times higher than that required by 2 mm glass. This pressure can still be generated by increasing rotational speed of the blower 5 close to a maximum. The gates 11 will be nevertheless slightly closed for facilitating work of the blower 5.

Thick 10 mm glass is at its tempering temperature even more rigid than 6 mm glass. In order to float, it requires in the air bed an overpressure of 5 times higher than that required by 2 mm glass. When the gates 11 are open, the glass does not float even when the blower 5 has its rotational speed at a maximum. Closing the gates 11 increases vigorously the average overpressure underneath the glass, and even 10 mm glass is brought to floating.

The invention is not limited to the above-described embodiment.

The invention is not limited to a construction described above and illustrated in the figures, in which the gate 11 is located right at the end of an exhaust passage 2. Another possible location for the gate 11 is in a channel connected to the exhaust passage downstream in the outflowing direction of air or upstream in the air support table 9 between the outermost exhaust aperture 1 and the end of the exhaust passage 2.

The invention is not limited to a construction described above and illustrated in the figures, in which the exhaust passages have not been connected to the blowers 5. The exhaust passages 2 can also be associated one way or another with a suction channel of the blower 5.

The invention claimed is:

1. An apparatus for conveying glass sheets comprising:
    an air support table included in a heating furnace, the air support table being provided with blast apertures and exhaust apertures, wherein the blast apertures are connected to a plenum chamber present underneath the air support table, and the exhaust apertures are connected to exhaust passages present inside the air support table, and
    a blower for conducting pressurized air into the plenum chamber;
    wherein each of the exhaust passages includes at least one end provided with a gate capable of being opened and closed, the at least one end opening directly to the heating furnace when the at least one gate is open;
    wherein air flowing directly into the heating furnace from the exhaust passage at the at least one end adjacent to the gate can be completely or partially blocked by means of the gate whereby closing the gate results in an increase in a glass supporting effect.

2. An apparatus according to claim 1, wherein the at least one end includes two ends, each end being provided with a gate, by means of which the flow of air from the exhaust passages into the heating furnace can be completely or partially blocked.

3. An apparatus according to claim 1, wherein the glass supporting effect for glass sheets is adapted to be adjustable by opening/closing the at gate provided at at least one end of each of the exhaust passages.

4. An apparatus according to claim 1, wherein the gate is adapted to be adjustable from outside the heating furnace when the heating furnace is closed.

5. An apparatus according to claim 1, wherein an aperture area opened up by the at least one gate decreases as the glass thickness increases.

6. An apparatus according to claim 1, wherein an aperture area opened up by the at least one gate increases as the glass temperature rises.

7. An apparatus according to claim 1, wherein an aperture area opened up by the at least one gate increases as a dwell time in the heating furnace increases.

8. An apparatus according to claim 1, wherein an aperture area opened up by the at least one gate increases in a glass moving direction.

* * * * *